United States Patent
Pateux et al.

(10) Patent No.: US 8,891,628 B2
(45) Date of Patent: Nov. 18, 2014

(54) METHODS FOR ENCODING AND DECODING A SIGNAL OF IMAGES, CORRESPONDING ENCODING AND DECODING DEVICES, SIGNAL AND COMPUTER PROGRAMS

(75) Inventors: Stéphane Pateux, Rennes (FR); Gordon Clare, Pace (FR); Joël Jung, Le Mesnil Saint Denis (FR)

(73) Assignee: France Telecom, Paris (FR)

( * ) Notice: Subject to any disclaimer, the term of this patent is extended or adjusted under 35 U.S.C. 154(b) by 359 days.

(21) Appl. No.: 13/379,197

(22) PCT Filed: Jun. 17, 2010

(86) PCT No.: PCT/FR2010/051209
§ 371 (c)(1),
(2), (4) Date: Dec. 19, 2011

(87) PCT Pub. No.: WO2010/146314
PCT Pub. Date: Dec. 23, 2010

(65) Prior Publication Data
US 2012/0134419 A1   May 31, 2012

(30) Foreign Application Priority Data
Jun. 19, 2009   (FR) ..................................... 09 54194

(51) Int. Cl.
*H04N 7/32*   (2006.01)
*H04N 19/51*   (2014.01)

(52) U.S. Cl.
CPC ................................ *H04N 7/26872* (2013.01)
USPC ................................ 375/240.16; 375/E7.123

(58) Field of Classification Search
None
See application file for complete search history.

(56) References Cited

U.S. PATENT DOCUMENTS

2008/0080617 A1* 4/2008 Kodama ................... 375/240.16
2008/0117978 A1* 5/2008 Kapasi et al. ............ 375/240.16

FOREIGN PATENT DOCUMENTS

WO    2008082158 A1    7/2008

OTHER PUBLICATIONS

Sung Deuk Kim and Jong Beom Ra, An Efficient Motion Vector Coding Scheme Based on Minimum Bitrate Prediction, Aug. 1999, IEEE Transactions on Image Processing, vol. 8, No. 8, p. 1117-1120.*
Joel Jung et al., "Competition-Based Scheme for Motion Vector Selection and Coding" Joint Video Team (JVT) of ISO/IEC MPEG & ITU-T VCEG (ISO/IEC JTC1/WG11 and ITU-T SG16 Q6), XX, XX, No. VCEG-AC06r1, Aug. 2, 2006, XP030003490.
French Search Report and Written Opinion dated Mar. 9, 2010 for corresponding French Application No. FR 0954194, filed Jun. 19, 2009.

(Continued)

Primary Examiner — Sath V Perungavoor
Assistant Examiner — Janese Duley
(74) Attorney, Agent, or Firm — David D. Brush; Westman, Champlin & Koehler, P.A.

(57) ABSTRACT

A method is provided for encoding an image signal that includes motion information, by selecting a motion vector from among a set of at least three candidate vectors for at least one actual block of an actual image to be encoded. The method includes: determining an optimal-selection subset containing some of the candidate vectors; selecting the motion vector from among the vectors of the optimal-selection subset; and inserting into the signal a piece of information designating the motion vector selected from among the vectors of the optimal-selection subset.

12 Claims, 4 Drawing Sheets

(56) References Cited

OTHER PUBLICATIONS

International Search Report and Written Opinion dated Aug. 5, 2010 for corresponding International Application No. PCT/FR2010/051209, filed Jun. 17, 2010.

English Translation of the International Preliminary Report on Patentability and Written Opinion dated Aug. 5, 2010 for corresponding International Application No. PCT/FR2010/051209, filed Jun. 17, 2010.

* cited by examiner

METHODS FOR ENCODING AND DECODING A SIGNAL OF IMAGES, CORRESPONDING ENCODING AND DECODING DEVICES, SIGNAL AND COMPUTER PROGRAMS

CROSS-REFERENCE TO RELATED APPLICATIONS

This Application is a Section 371 National Stage Application of International Application No. PCT/FR2010/051209, filed Jun. 17, 2010, which is incorporated by reference in its entirety and published as WO 2010/146314 on Dec. 23, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the encoding and decoding of images, and especially of video streams constituted by a series of successive images. More specifically the disclosure pertains to the compression of images or image sequences using block transforms, exploiting different modes of encoding.

The disclosure can thus be applied especially to video encoding implemented in present-day video encoders (MPEG, H.264 etc) or future video encoders (ITU-T/VCEG (H.265) or ISO/MPEG (HVC).

BACKGROUND OF THE DISCLOSURE

There already exist known image encoding schemes (JPEG, JPEG-XR) or hybrid video encoding schemes (MPEG, H.264) as well as video data compression techniques. Among these, numerous video encoding techniques use a blockwise representation of the video sequence, for example techniques implementing the video compression standards derived from the MPEG organization (MPEG-1, MPEG-2, MPEG-4 part 2, etc) or l'ITU-T (H.261, . . . , H.264/AVC).

Figure 1A:
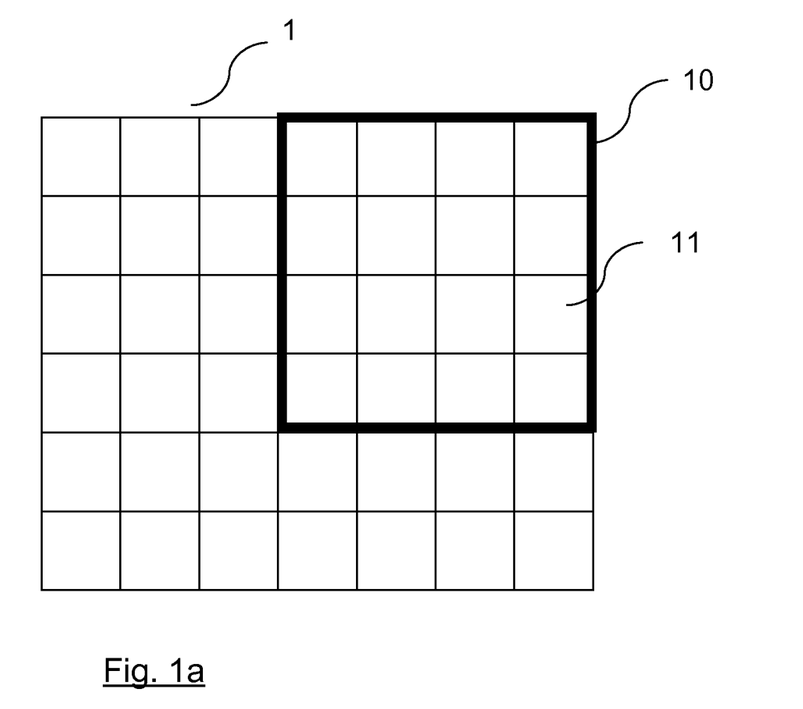

Thus, according to the H.264 technique and as illustrated in FIG. 1a, each image 1 can be sub-divided into slices, themselves sub-divided into macroblocks 10 which are then sub-divided into blocks 11. A block is constituted by a set of pixels.

The encoding of a block is classically achieved by means of a prediction of the block and an encoding of a prediction residue to be added to the prediction. The prediction is made by means of already rebuilt information (already encoded/decoded preceding blocks in the current image, preliminarily encoded images in the context of a video encoding, etc).

In a given encoding scheme, several different encoding modes can be implemented for the encoding of the blocks. An encoding mode generally comprises two phases, a first phase of prediction of the samples to be encoded followed by a second phase of encoding of prediction residues. Typically, the blocks can be encoded by different encoding modes such as intra, inter, skip encoding modes.

For these different encoding modes, the first phase of prediction of the samples typically corresponds to:
  a temporal prediction, i.e. with reference to a reference block belonging to one or more images; and/or
  a spatial prediction as a function of blocks neighboring the block to be encoded of the current image.

In this latter case, the prediction cannot be done except on the basis of the blocks which have been previously encoded.

The encoding mode known as the "intra" mode uses only information contained in the image itself. In other words, the prediction of a block of an image encoded in intra mode has recourse to previously encoded neighboring blocks of the same image. For example, a current block is encoded by means of a value of texture of the already encoded/decoded neighboring blocks.

The encoding mode known as the "inter" encoding mode uses a prediction by means of motion compensation from previously encoded images. More specifically, this type of encoding consists in considering one (or more) reference images. A shift or motion between the reference image and the current image is set up for a block to be encoded of the current image. The block used for predicting the block to be encoded is the block of pixels of the reference image shifted by the value of the motion vector.

The encoding mode known as the "skip" mode is a particular mode of "inter" encoding and achieves a temporal prediction for which no information is transmitted to the decoder. In other words, it is possible to "skip" a block if pieces of basic encoding information have already been determined for this block. In this encoding mode, the prediction is done using a motion compensation of the current block by means of the motion vectors of the neighboring blocks if they exist in the reference image, and no prediction residue is encoded or decoded.

For a given encoding mode, prediction parameters are then established, and then encoded. For example, according to the H.264 technique, it is possible to encode prediction parameters for each block, such as the encoding mode (intra, inter, skip), the type of partitioning, information on prediction (orientation, reference image etc), motion information (motion vector), texture information (direction of extrapolation of the texture values), encoded coefficients etc.

According to the H.264 technique, images I are encoded by spatial prediction (intra prediction), images P and B are encoded by temporal prediction relatively to the other images I, P or B encoded/decoded by motion compensation.

During the encoding of these prediction parameters (for example the motion vector of the block), in order to reduce their encoding cost, their value is predicted from the values of the same prediction parameters for the already encoded neighboring blocks, and having the same encoding mode (for example the motion vectors of the neighboring blocks).

For example, the motion vector used on a block encoded in "inter" mode is encoded by means of a predictive encoding such as the following:
  at a first stage, a prediction vector for the motion vector of the block considered is set up. Typically, such a vector, known as a median vector, is defined from the median values of the components of the motion vectors of already encoded neighboring blocks;
  at a second stage, the prediction error, i.e. the difference between the motion vector of the current block and the previously established prediction vector is encoded.

An extension of this technique of motion vector prediction is proposed by J. Jung and G. Laroche in the document <<Competition-Based Scheme for Motion Vector Selection and Coding>>, ITU-T VCEG, AC06, July 2006.

This technique consists in placing several predictors or prediction candidate vectors (beyond the median predictor used by AVC) in competition and indicating which vector, of the set of prediction candidate vectors, is the vector effectively used.

However, with this technique of encoding by competition, the definition of this set of predictors is difficult. Indeed, the fact of increasing the number of these candidates (through a greater set) gives a better prediction but has the detrimental effect of a higher cost of indicating the predictor to be used.

SUMMARY

There is therefore a need for a novel technique that can be used especially to obtain better performance in the encoding of a given block, while at the same time restricting the cost of the signaling and therefore providing better compression efficiency.

An exemplary embodiment of the invention proposes a method for encoding an image signal comprising motion information, by the selection of a motion vector from a set of at least three candidate vectors, for at least one current block of a current image to be encoded.

According to an embodiment of the invention, such method for encoding comprises a step of determining an optimal selection subset, containing a part of said candidate vectors, and a step of selection of said motion vector from among the vectors of said optimal selection subset, and a step of insertion, into said signal, of a piece of information on designation of the motion vector selected among the vectors of said optimal selection subset.

Thus, an embodiment of the invention relies on a novel and inventive approach to the encoding of image signals, and more particularly, the predictive encoding of motion vectors by competition, making it possible to obtain a better prediction through a greater choice of motion vectors, while offering greater efficiency of compression, according to a method implemented in a transmitter and reproducible by at least one receiver.

Indeed, an embodiment of the invention is based on a set of locally adaptive motion vectors, i.e. by image block, enabling a choice of the motion vector from a better-adapted set of motion vectors, denoted as an optimal selection subset, while at the same time restricting the cost of the signaling of motion vector use.

According to one particular embodiment, said step for determining an optimal selection subset comprises the following sub-steps:

comparing at least two first candidate vectors, delivering a piece of information on proximity between said first candidate vectors, capable of taking a first value indicating that said first candidate vectors are identical or proximate according to a predetermined criterion, and a second value indicating that said first candidate vectors are not identical or proximate according to said predetermined criterion;

if said information on proximity takes said first value, then building said optimal selection subset with one of said first candidate vectors and at least one second candidate vector, distinct from said first candidate vectors;

if said information on proximity takes said second value, building said optimal selection subset with said first candidate vectors.

Thus, the method for encoding of an embodiment of the invention can be used to propose, for a block of the image to be encoded, a subset of candidate motion vectors that are more adapted, for example when the first candidate motion vectors are proximate or equal, according to a first criterion.

The prediction is optimized, the motion vector being chosen from this optimal selection subset, containing better candidates in principle.

According to a particular characteristic of an embodiment of the invention, said first candidate vectors belong to a subset of candidate vectors associated with at least one of the blocks neighboring said current block, of a pre-identified position in space and/or in time.

Thus, the first candidate motion vectors can for example be associated with:

the block situated to the left of the current block (denoted A);

the block situated above the current block (denoted B);

the block situated above and to the right of the current block (denoted C);

the block situated above and to the left of the current block (denoted D);

a block of the image preceding the current image, called a reference image, and situated at the same position as the current block (denoted as T).

The first candidate motion vectors can also be built from the median values of the components of certain or all the motion vectors associated with the blocks A, B, C and D (the median motion vector).

The first candidate motion vectors can also be associated with a block of the image preceding the current image and situated at the same position as said current block, shifted by the value of the motion vector (motion compensated) or can correspond to vectors coming from a "template matching" technique etc.

According to one particular embodiment of the invention, said first subset comprises the candidate vector associated with the block (A) situated directly to the left of said current block in the current image and the candidate vector associated with the block (B) situated directly above said current block in the current image.

According to one particular characteristic of an embodiment of the invention, said second candidate vector is a vector associated with a block of the image preceding the current image and situated in the same position as said current block.

Thus, the second candidate motion vector can for example be associated with the block (T).

This embodiment is called "AB plus T" because it uses a first "default" set comprising the candidate motion vectors associated with the blocks (A) and (B), and then a second candidate motion vector associated with the block (T), if the candidate motion vectors associated with the blocks (A) and (B) are equal or proximate.

According to one particular characteristic of an embodiment of the invention, the implementation of said predetermined criterion belongs to the group comprising equality between said first candidate vectors and the comparison of the difference between said first candidate vectors with a first predetermined threshold.

Thus, when the first motion vectors are equal, it is preferable to propose another candidate motion vector to propose a real choice of motion vectors (between one of the first equal motion vectors and this other candidate vector) in an optimum selection subset in order to place them in competition.

Similarly, when the first motion vectors are proximate, it is preferable in principle to propose another candidate motion vector, in order to propose a choice of motion vectors sufficiently distant (between one of the first proximate motion vectors and this other candidate vector) and thus optimize the placing of the candidate motion vectors in competition.

According to one particular embodiment of the invention, said comparison step is repeated at least once on a second subset comprising one of said first candidate vectors and at least one second candidate vector distinct from said first candidate vectors.

Thus, an embodiment of the invention makes it possible to propose, in an optimal selection subset, the candidate motion vectors that are distinct and at a sufficient distance.

For example, when the first candidate motion vectors are proximate or equal and when the candidate motion vectors of the second built subset are equally so, then an embodiment of the invention enables the building of a third subset, the optimal selection subset having sufficiently distant candidate motion vectors.

According to one embodiment of the invention, said step for determining an optimal selection subset comprises a sub-step for rejecting a candidate vector if this candidate vector has a difference with at least one other candidate vector that is greater than a second predetermined threshold.

Thus, an embodiment of the invention also makes it possible not to propose an optimal selection subset comprising candidate motion vectors that are too distant from one another (which would make it difficult to place these two candidate vectors in competition during the selection step), by comparing the candidate motion vectors that are to be present in this optimal selection subset.

Another aspect of an embodiment of the invention pertains to a computer program comprising instructions to implement the method for encoding as described here above when said program is executed by a processor.

It can indeed be noted that the method for encoding of an embodiment of the invention can be implemented in various ways, in particular in wired form or in software form.

Another aspect of an embodiment of the invention pertains to a device for encoding an image signal comprising pieces of information on motion by selection of a motion vector from a set of at least three candidate vectors for at least one current block of an image to be encoded.

According to an embodiment of the invention, such a device for encoding comprises means for determining an optimal selection subset containing a part of said candidate vectors and means for selecting said motion vector from among the vectors of said optimal selection subset and, means for inserting, into said signal, a piece of information designating the motion vector selected among the vectors of said optimal selection subset.

Such a device for encoding is especially adapted to implement the method for encoding described here above. It is for example an MPEG or H.264 type video encoder or a video encoder according to a future compression standard.

This device for encoding could of course comprise the different characteristics pertaining to the method for encoding according to an embodiment of the invention.

Another aspect of an embodiment of the invention also pertains to an image signal generated according to the method for encoding described here above.

According to an embodiment of the invention such a signal comprises, for at least one current block of a current image to be encoded, a piece of information designating a motion vector selected among the vectors of an optimal selection subset, determined at encoding and decoding, and containing a part of a set of candidate vectors.

Such a signal could of course comprise the different characteristics pertaining to the method for encoding of an embodiment of the invention.

Another aspect of an embodiment of the invention pertains to a method for decoding pieces of motion information by the selection of a motion vector selected when encoding from among a set of at least three candidate vectors for at least one current block of a current image to be decoded.

According to an embodiment of the invention, such a method for decoding comprises a step for determining an optimal selection subset containing a part of said candidate vectors similarly to a determining that is implemented when encoding, and a step for reading a piece of selection information provided by the encoding and designating one of the vectors of said optimal selection subset and a step for selecting said motion vector from among the vectors of said optimal selection subset from said piece of selection information read.

According to one embodiment of the invention, said step for determining an optimal selection subset comprises the following sub-steps:

comparing at least two first candidate vectors, delivering a piece of information on proximity between said first candidate vectors, capable of taking a first value indicating that said first candidate vectors are identical or proximate according to a predetermined criterion and a second value indicating that said first candidate vectors are not identical or proximate according to said predetermined criterion;

if said information on proximity takes said first value, then building said optimal selection subset with one of said first candidate vectors and at least one second candidate vector, distinct from said first candidate vectors;

if said information on proximity takes said second value, building said optimal selection subset with said first candidate vectors.

In this way, the decoding technique of an embodiment of the invention makes it possible, at reception and reading of the pieces of encoding information and more particularly a piece of information on selection, to determine the motion vector corresponding to the current block being decoded from an optimal selection subset determined by the same method as that implemented by the method for encoding.

Another aspect of an embodiment of the invention pertains to a computer program comprising instructions to implement the method for decoding as described here above when said program is executed by a processor.

It can indeed be noted that the method for decoding of an embodiment of the invention can be implemented in various ways, in particular in wired form or in software form.

This method for decoding could of course comprise the different characteristics pertaining to the method for encoding according to an embodiment of the invention.

In another embodiment, the invention pertains to a device for decoding pieces of motion information by selection of a motion vector selected, when encoding, from amongst a set of at least three candidate vectors for at least one current block of a current image to be decoded.

According to an embodiment of the invention, such a device for decoding comprises means for determining an optimal selection subset containing a part of said candidate vectors, similarly to a determining that is implemented when encoding, and means for reading a piece of selection information provided by the encoding and designating one of the vectors of said optimal selection subset and means for selecting said motion vector among the vectors of said optimal selection subset from said piece of selection information read.

Such a device for decoding is especially adapted to implementing the method for decoding described here above. It is, for example, an MPEG or H.264 type video decoder, or a decoder according to a future video compression standard.

This device for decoding could of course comprise the different characteristics relative to the method of decoding according to an embodiment of the invention.

BRIEF DESCRIPTION OF THE DRAWINGS

Other features and advantages shall appear from the following description of a particular embodiment, given by way of an indicative and non-exhaustive example and from the appended drawings, of which FIG. 1a, already commented upon with reference to the prior art, presents the sub-division of an image into a set of blocks.

DETAILED DESCRIPTION OF ILLUSTRATIVE EMBODIMENTS

1. General Principle

The general principle of an embodiment of the invention relies on the use of a set of predictors (also called candidate motion vectors) that are locally adaptive, for the selection of a motion vector by competition among motion vectors. According to an embodiment of the invention, the adaptation can be done for each block of an image to be encoded as a function of the values of the candidate motion vectors of a first set of predictors.

Thus, according to an embodiment of the invention, the encoding of a piece of motion information by competition among motion vectors is based on an automatic adaptation, from one block to the other within an image to be encoded, of a set of predictors to be used for setting up competition.

Figure 1B:
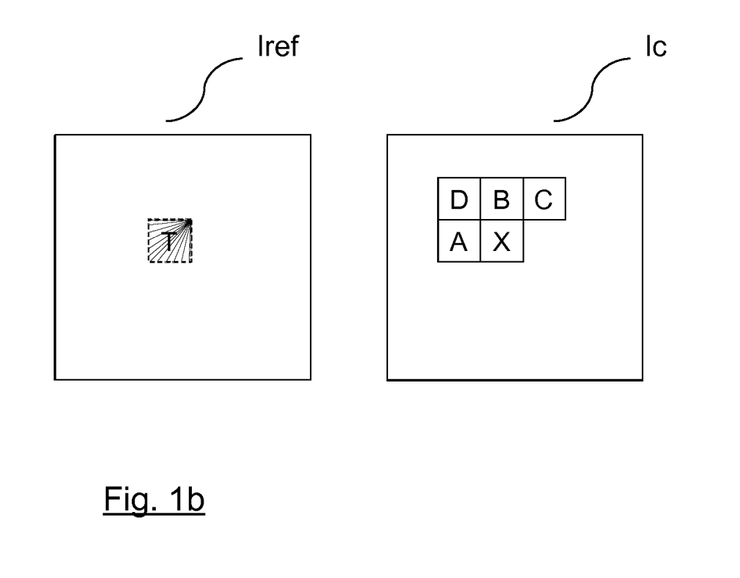
FIG. 1b illustrates examples of neighborhood relationships for a given block.

Classically, for a predictive encoding of motion vectors by competition, a set of candidate motion vectors, from among which a motion vector is selected and encoded, is considered for a block of an image to be encoded. These candidate motion vectors can be associated with at least one of the blocks neighboring said current block, of a pre-identified position in space and/or in time, as illustrated in FIG. 1b.

For example, the candidate motion vectors for the encoding of the current block X of the current image Ic can be associated with the neighboring blocks in the space (A), (B), (C) or (D), and/or the temporally neighboring block (T) of the reference image Iref.

The candidate motion vectors can also be associated with a block of the image preceding the current image and situated at the same position as said current block, shifted by the value of the motion vector (motion compensated) or may correspond to vectors coming from a "template matching" technique etc.

2. Description of Embodiments of the Method for Encoding

Figure 2A:
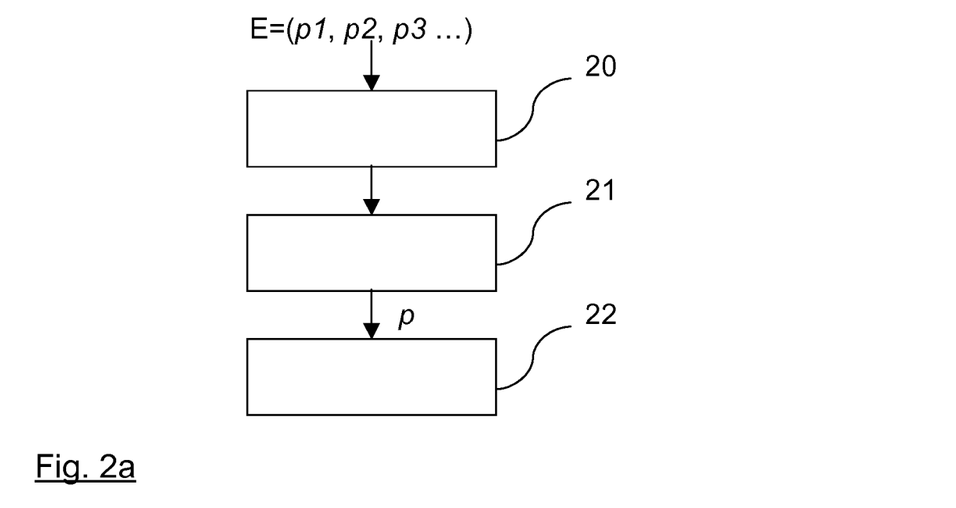
FIG. 2a presents the main steps of the method for encoding according to one embodiment of the invention.

According to one embodiment of the invention, and as illustrated in FIG. 2a, for a current block of an image to be encoded, a set E of candidate motion vectors (p1, p2, p3, . . . ) is available in order to select the motion vector to be considered for the block considered.

A first step 20 for determining a subset of candidate motion vectors, from the set E, is implemented, delivering an optimal detection subset. This determining step 20 is described in greater detail here below, with reference to FIG. 2b.

Once this optimal detection subset has been determined, the candidate motion vectors that it contains are placed in competition according to a prior-art technique (described for example in J. Jung and G. Laroche, "*Competition-Based Scheme for Motion Vector Selection and Coding*", ITU-T VCEG, AC06, July 2006, already mentioned with reference to the prior art) for the selection, at a step 21, of a motion vector p to be encoded for the block considered.

Finally, at a step 22, a piece of information for designating this selected motion vector p is inserted into the signal, in order to enable the device for decoding to select this motion vector too, for the decoding of the block considered.

Figure 2B:
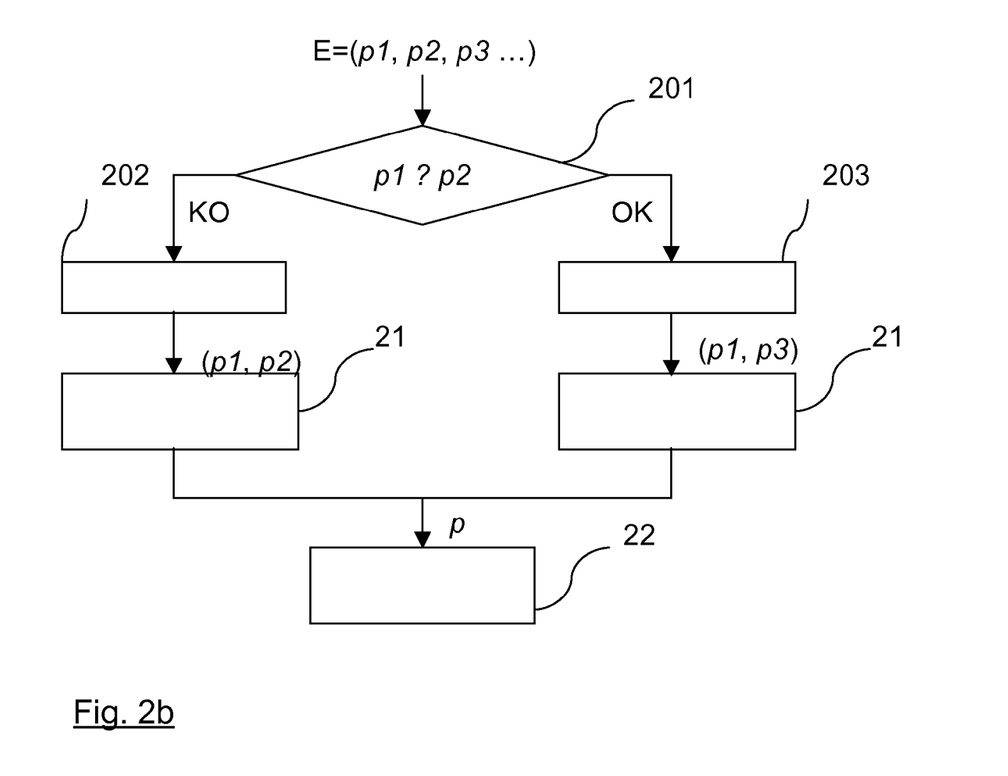
FIG. 2b presents more detailed steps of the method for encoding according to this embodiment of the invention.

We shall now present in greater detail the different sub-steps enabling the building of the optimal detection subset with reference to FIG. 2b.

The principle relies on the comparison, at the step 201, of at least two first motion vectors of the set E, denoted for example as p1 and p2. It must be noted that this comparison can also be done for a greater number of motion vectors, depending on the number of motion vectors that are to be then placed in competition. The choice of the number of motion vectors generates a greater or lower signaling cost, and is therefore defined as a function of the performance values desired for the encoding of the motion information, especially, and therefore of the compression performance desired.

This first step of comparison makes it possible to determine whether these two first motion vectors p1 and p2 are capable of forming a set of optimal motion vectors with a view to placing them in competition.

For example, p1 may be associated with the block (A) and p2 with the block (B) of the current image (cf. FIG. 1b). This choice is predetermined by and known to the decoder, so that the decoder can implement a method for decoding identical to the method for encoding implemented. Indeed, as described here above with reference to FIGS. 3a and 3b, the method for decoding implements the same steps as the method for encoding and the decoder knows a certain number of parameters used by the encoder in order to optimize signaling costs.

According to a first variant of this embodiment, this comparison step 201 consists of a test of equality of the first two motion vectors p1 and p2.

Indeed, in a first step, if p1 and p2 are identical, the step 21 for placing these two vectors in competition is not necessary, and necessarily delivers p1=p2 as a motion vector to be encoded for the current block considered. It is therefore worthwhile in this case, in order to optimize the prediction, to build, at a step 203, another set of candidate motion vectors that are not equal, from p1 (=p2) and at least one other motion vector p3 derived from the set E.

This subset, denoted as an optimal detection subset, comprises for example the vectors p1 (=p2) and p3, where p3 is for example associated with the block (T) of the reference (cf. FIG. 1b). Similarly, as in the case of the choice of the first motion vectors p1 and p2, the choice of p3 is predetermined and known to the decoder.

The selection of the motion vector to be encoded for the considered block is then done during a step 21 previously described with reference to FIG. 2a, from this optimal detection subset. The vector p selected is therefore either the vector p1 or the vector p3.

On the other hand, in a second case, if p1 and p2 are not equal, the building step 202 delivers an optimal detection subset comprising the vectors p1 and p2.

The selection of the motion vector to be encoded, for the block considered, is then done at the step 21, previously described with reference to 2a, from this optimal detection subset. The selected vector p is therefore either the vector p1 or the vector p2.

In the preceding two cases, a step 22 of insertion, into the signal, of a piece of information designating this selected motion vector p, as described here above with reference to FIG. 2a, is implemented in order to enable the device for decoding to select this motion vector too for the decoding of the block considered.

According to a second variant of this embodiment, the comparison step 201 consists of a test of proximity of the first two motion vectors p1 and p2.

This proximity test may consist in comparing the difference between the first candidate vectors with a predetermined threshold. This threshold is defined concertedly between the encoder and the decoder and can be variable within an image.

Thus, if p1 and p2 are proximate, the step 21 for placing these two vectors in competition is considered not to be optimal because of the proximity of the vectors p1 and p2. It is therefore also worthwhile, in this case, in order to optimize the prediction, to build another set of non-proximate candidate motion vectors during a step 203, from p1 (or p2, or again a mean of the amplitudes of the motion vectors p1 and p2) and at least one other motion vector p3 coming from the set E.

The following steps 21 and 22 are the same as those described previously for the first variant.

According to a third variant (not illustrated in the figures), an additional test is implemented before building the optimal detection subset in order to set aside certain candidate motion vectors present in the set E because of their excessive distance relative to the first motion vector p1.

Thus, if we take the case where the first two vectors p1 and p2 are equal or proximate, a third vector p3 is chosen to build the optimal detection subset according to the steps described here above. As already indicated, this choice is predefined and may consist for example in choosing p3 as being the motion vector associated with the block (T) of the reference image.

However, in certain particular cases, it can prove to be the case that p3 and p1 are for too distant from each other or far too proximate for their placing in competition to be representative.

This alternative embodiment of the method for encoding of the invention makes it possible to remedy these particular cases by rejecting or invalidating the vector p3 as a candidate motion vector and by optionally taking another vector p4, also preliminarily defined, to build, with p1, the optimal detection subset.

This additional test can therefore for example consist of a comparison of the values of p1 and p3 and give rise to a rejection of p3 if the result of the comparison is greater or smaller than a predetermined threshold.

This additional test may also consist of a comparison of the amplitude of the vector p3 with a predetermined threshold and give rise to a rejection of p3 if the amplitude of the vector p3 is greater than or lower than this predetermined threshold.

For example, this predetermined threshold can be written as follows:

$$\sqrt{\left(\frac{(1-p)}{p}\right)},$$

where p corresponds to the probability of choosing the candidate motion vector p3 when p1 and p3 are placed in competition, it being possible for this probability to be variable by learning.

This variant makes it possible again to obtain better prediction efficiency.

According to a fourth variant, if p1 or p2 are not available (for example when the current block is situated on the left-hand edge of the image, then the block (A) does not exist and therefore no motion vector associated with this block (A) is available or else should the block (A) have been encoded in "intra" mode or in "inter" mode but by using a different reference image etc), then an optimal detection subset is directly built from p2 and p3 if p1 is not available or from p1 and p3 if p2 is not available.

According to a second embodiment not shown in the figures, it is possible to iterate the step for comparing candidate motion vectors so as to optimize the building of the optimal detection subset to the maximum.

For example, if the first two motion vectors p1 and p2 are considered to be equal or proximate, then a subset comprising the vector p1 and another vector p3 is built according to the embodiment described here above. According to this previous embodiment, the selection of the motion vector to be encoded for the current block is done from among these two vectors p1 and p3.

By contrast, in this second embodiment, the two vectors p1 and p3 are again compared so as to build another optimal detection subset should p1 and p3 be equal or proximate (according to the criterion considered). In this case, a motion vector p4 can be used to build the optimal detection subset, with p1 (=p2=p3).

Thus, this iteration makes it possible, to the extent possible and as a function of the number of motion vectors available in the set E, to implement the selection step 21 for a set comprising two equal or proximate candidate motion vectors in order to optimize the placing of the candidate motion vectors in competition.

The number of iterations can be predefined and therefore known to the decoder, or else it can be decided that so long as the two selected vectors are equal or proximate, an additional iteration is implemented until the number of candidate motion vectors available in E is used up.

It must be noted that, in certain particular cases, for one or more blocks of the image to be encoded, where the designation of the motion vector is immediate, it is possible to refrain from transmitting a piece of information designating the prediction motion vector to be used. These particular cases correspond for example to the case where the candidate motion vectors in E are all identical or else to the case where only one motion vector is available.

The different embodiments described here above, as well as their variants, make it possible to obtain an encoding that potentially uses three candidate motion vectors for the placing in competition, while at the same time having an encoding cost corresponding to the use of two candidate motion vectors. This is possible because the decoder will be capable of reproducing the approach performed during encoding (test 201 especially) as explained here below, and because it is not necessary to transmit a corresponding piece of information.

It may be recalled that an embodiment of the invention can also implement optimal detection subsets comprising more than two candidate motion vectors, the selection of the motion vector to be encoded for the current block being done from among more than two vectors, and the information for signaling the vector chosen having a cost relative to the number of candidate motion vectors. However, here again, an embodiment of the invention makes it possible to obtain an encoding that potentially uses a number of candidate motion vectors greater than in the prior art without increasing the cost of encoding.

Furthermore, the method of encoding according to an embodiment of the invention enables local adaptation, i.e. adaptation for each block to be encoded of an image, of the optimal prediction subset to be used for placing candidate motion vectors in competition.

3. Description of Embodiments of the Method for Decoding

The principle of an embodiment of the invention relies on the implementation, at encoding and at decoding, of a same method of selection of a motion vector for a block considered.

Figure 3A:
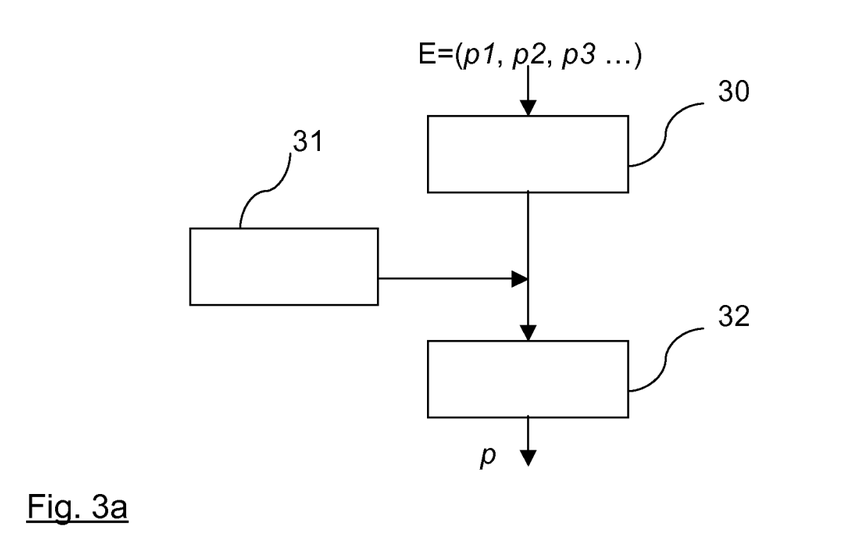
FIG. 3a presents the main steps of the method for decoding according to one embodiment of the invention.
Figure 3B:
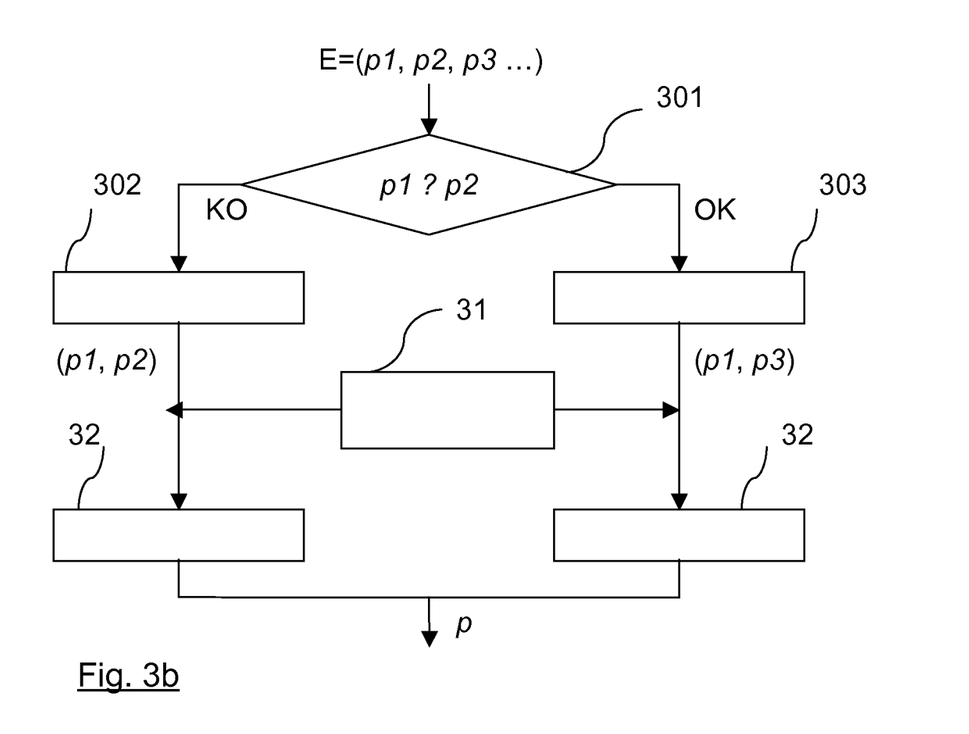
FIG. 3b presents more detailed steps of the method for decoding, according to this embodiment of the invention.

A description shall now be given of the main steps of the method for decoding according to an embodiment of the invention with reference to FIGS. 3a and 3b for a signal comprising motion information encoded according to one embodiment of the method for encoding as described here above.

As illustrated in FIG. 3a and as described here above with reference to FIGS. 2a and 2b referring to the method for encoding, for a current block of an image to be decoded, a set E of candidate motion vectors (p1, p2, p3, . . . ) is available, in order to select the motion vector to be decoded for the block considered.

A first step 30 for determining a subset of candidate motion vectors from the set E, is implemented, delivering an optimal detection subset. This determining step 30 is described in greater detail here below with reference to FIG. 3b and corresponds to the step 20 of the method for encoding.

A reading step 31 delivers a piece of information designating the motion vector selected p at an encoding, this information being inserted into the signal at encoding, as described here above (step 22 of the method for encoding).

This piece of information enables a device for decoding, during a step 32, to select the prediction motion vector to be used to decode the block considered, from among the candidate motion vectors present in the optimal detection subset determined at the step 30 of the method for decoding.

The different sub-steps enabling the building of the optimal detection subset are illustrated in greater detail in FIG. 3b and have already been described here above with reference to FIG. 2b.

Indeed, the steps 301, 302 and 303 of the method for decoding correspond respectively to the steps 201, 202 and 203 of the method for encoding In particular, several variants of the method for decoding can be implemented, depending on whether the criterion of comparison is based on an equality or a proximity, or depending on the implementation or non-implementation of an iteration of the comparison step 301 etc.

Thus, the optimal selection subset determined by the method for decoding according to this embodiment of the invention corresponds to the optimal detection subset obtained at the coding.

Thus, with this optimal detection subset (comprising the vectors p1 and p2, or p1 and p3 for example) and the piece of information designating the motion vector selected and therefore to be used, that is read during the step 31, the method for decoding can select the right motion vector for the decoding of the block considered during one of the steps 32.

4. Structure of Devices for Encoding and Decoding

Figure 4:
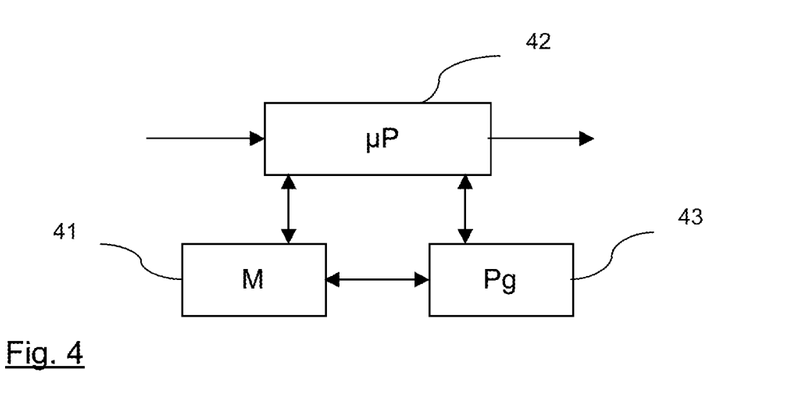
FIGS. 4 and 5 respectively present the structure of a device for encoding and a device for decoding according to one particular embodiment of the invention.
Figure 5:
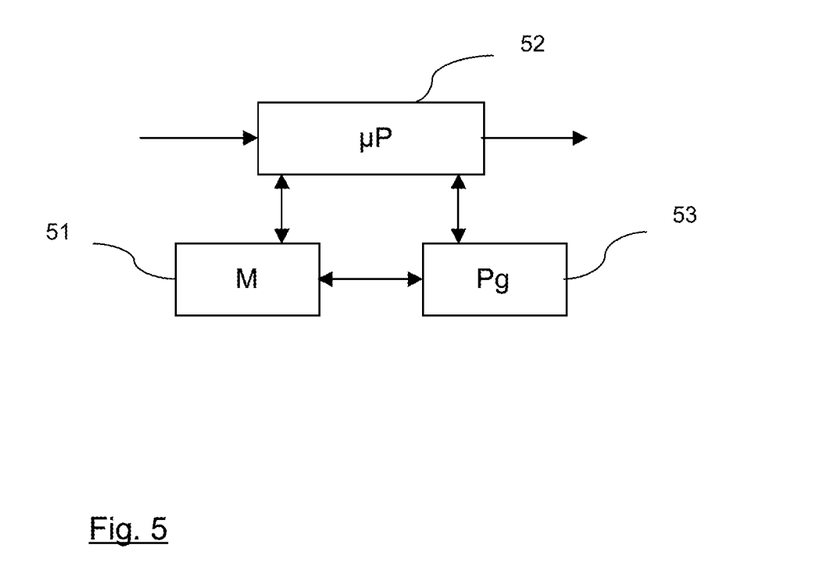

Referring to FIGS. 4 and 5, we finally present the simplified structure of an encoding device and a device for decoding according to the embodiments described here above.

As illustrated in FIG. 4, an encoding device of this kind comprises a memory 41 comprising a buffer memory, a processing unit 42, equipped for example with a microprocessor µP and driven by the computer program 43 implementing the method for encoding according to an embodiment of the invention.

At initialization, the computer program code instructions 43 are for example loaded into a RAM and then executed by the processor of the processing unit 42. The processing unit 42 inputs an image signal comprising pieces of motion information, among them a set of at least three candidate motion vectors. The microprocessor of the processing unit 42 implements the steps of the method for encoding described here above according to the instructions of the computer program 43 to select a motion vector. To this end, the encoding device comprises, in addition to the buffer memory 41, means for determining an optimal selection subset, containing a part of the candidate vectors, means for selecting a motion vector from among the vectors of the optimal selection subset, and means of insertion, into the signal, of a piece of information designating the motion vector selected from among the vectors of the optimal selection subset. These means are driven by the microprocessor of the processing unit 42. The processing unit 42 therefore sends at least one device for decoding a signal comprising at least one piece of information designating the selected motion vector.

As illustrated in FIG. 5, a device for decoding of this type for its part comprises a memory 51 comprising a buffer memory, a processing unit 52 equipped for example with a processor µP and driven by the computer program 53 implementing the method for decoding according to an embodiment of the invention.

At initialization, the code instructions of the computer program 53 are for example loaded into a RAM and then executed by the processor of the processing unit 52. The processing unit 52 inputs a signal comprising especially motion information. The microprocessor of the processing unit 52 implements the steps of the method for decoding described here above, according to the instructions of the computer program 53 to select a motion vector. To this end, the device for decoding, in addition to the buffer memory 51, comprises means for determining an optimal selection subset, comprising a part of the vector candidates, similarly to a determining implemented at encoding, means for reading a piece of selection information provided by the encoding and designating one of the vectors of the optimal selection subset and means for selecting the motion vector from among the vectors of the optimal selection subset from the selection information read. These means are driven by the microprocessor of the processing unit 52.

Although the present disclosure has been described with reference to one or more examples, workers skilled in the art will recognize that changes may be made in form and detail without departing from the scope of the disclosure and/or the appended claims.

The invention claimed is:

1. A method for encoding an image signal comprising motion information, the method comprising:
selecting a motion vector from a set of at least three candidate vectors, for at least one current block of a current image to be encoded, wherein selecting comprises:
a step of determining an optimal selection subset, containing a part of said candidate vectors, a step of selecting said motion vector from among the vectors of said optimal selection subset, and a step of inserting into said signal a piece of information on designation of the motion vector selected among the vectors of said optimal selection subset;

wherein said step of determining an optimal selection subset comprises the following sub-steps:

comparing at least two first candidates vectors, delivering a piece of information on proximity between said first candidate vectors, capable of taking a first value indicating that said first candidate vectors are identical or proximate according to a predetermined criterion, and a second value indicating that said first candidate vectors are not identical or proximate according to said predetermined criterion;

if said information on proximity takes said first value, building said optimal selection subset with one of said first candidate vectors and at least one second candidate vector, distinct from said first candidate vectors; and if said information on proximity takes said second value, building said optimal selection subset with said first candidate vectors.

2. The method for encoding according to claim 1, wherein said first candidate vectors belong to a subset of candidate vectors associated with at least one of the blocks neighboring said current block, of a pre-identified position in space and/or in time.

3. The method for encoding according to claim 2, wherein said first subset comprises the candidate vector associated with the block situated directly to the left of said current block in the current image and the candidate vector associated with the block situated directly above said current block in the current image.

4. The method for encoding according to claim 3, said second candidate vector being a vector associated with a block of the image preceding the current image and situated in the same position as said current block.

5. The method for encoding according to claim 1, wherein implementation of said predetermined criterion belongs to the group consisting equality between said first candidate vectors and comparison of the difference between said first candidate vectors with a first predetermined threshold.

6. The method for encoding according to claim 1, wherein said comparison step is repeated at least once on a second subset comprising one of said first candidate vectors and at least one second candidate vector distinct from said first candidate vectors.

7. The method for encoding according to claim 1, wherein said step of determining an optimal selection subset comprises a sub-step for rejecting a candidate vector if this candidate vector has a difference with at least one other candidate vector that is greater than a second predetermined threshold.

8. A non-transitory computer-readable memory comprising a computer program recorded therein and comprising instructions to implement a method for encoding an image signal comprising motion information, when said program is executed by a processor, wherein the method comprises:

selecting a motion vector from a set of at least three candidate vectors, for at least one current block of a current image to be encoded, wherein selecting comprises:

a step of determining an optimal selection subset, containing a part of said candidate vectors, a step of selecting said motion vector from among the vectors of said optimal selection subset, and a step of inserting into said signal a piece of information on designation of the motion vector selected among the vectors of said optimal selection subset;

wherein said step of determining an optimal selection subset comprises the following sub-steps:

comparing at least two first candidates vectors, delivering a piece of information on proximity between said first candidate vectors, capable of taking a first value indicating that said first candidate vectors are identical or proximate according to a predetermined criterion, and a second value indicating that said first candidate vectors are not identical or proximate according to said predetermined criterion;

if said information on proximity takes said first value, building said optimal selection subset with one of said first candidate vectors and at least one second candidate vector, distinct from said first candidate vectors; and if said information on proximity takes said second value, building said optimal selection subset with said first candidate vectors.

9. A device for encoding an image signal comprising motion information, wherein the device comprises:

means for selecting a motion vector from a set of at least three candidate vectors, for at least one current block of an image to be encoded, including:

means for determining an optimal selection subset containing a part of said candidate vectors, means for selecting said motion vector from among the vectors of said optimal selection subset; and means for inserting, into said signal, a piece of information designating the motion vector selected from among the vectors of said optimal selection subset;

wherein said means for determining an optimal selection subset are configured to:

compare at least two first candidates vectors, delivering a piece of information on proximity between said first candidate vectors, capable of taking a first value indicating that said first candidate vectors are identical or proximate according to a predetermined criterion, and a second value indicating that said first candidate vectors are not identical or proximate according to said predetermined criterion;

if said information on proximity takes said first value, build said optimal selection subset with one of said first candidate vectors and at least one second candidate vector, distinct from said first candidate vectors; and if said information on proximity takes said second value, build said optimal selection subset with said first candidate vectors.

10. A method for decoding pieces of motion information by selection of a motion vector for at least one current block of a current image to be decoded, wherein the method comprises:

a step of determining an optimal selection subset containing a part of a set of at least three candidate vectors;

a step of reading a piece of selection information provided by encoding and designating one of the vectors of said optimal selection subset; and a step of selecting said motion vector from among the vectors of said optimal selection subset from said piece of selection information read;

wherein said step of determining an optimal selection subset comprises the following sub-steps:

comparing at least two first candidates vectors, delivering a piece of information on proximity between said first candidate vectors, capable of taking a first value indicating that said first candidate vectors are identical or proximate according to a predetermined criterion and a second value indicating that said first candidate vectors are not identical or proximate according to said predetermined criterion;

if said information on proximity takes said first value, building said optimal selection subset with one of said first candidate vectors and at least one second candidate vector, distinct from said first candidate vectors; and if said information on proximity takes said second value, building said optimal selection subset with said first candidate vectors.

11. A non-transitory computer-readable memory comprising a computer program recorded therein and comprising instructions to implement a method of decoding pieces of motion information by selection of a motion vector for at least one current block of a current image to be decoded, when said program is executed by a processor, wherein the method comprises:

a step of determining an optimal selection subset containing a part of a set of at least three candidate vectors;

a step of reading a piece of selection information provided by encoding and designating one of the vectors of said optimal selection subset; and a step of selecting said motion vector from among the vectors of said optimal selection subset from said piece of selection information read;

wherein said step of determining an optimal selection subset comprises the following sub-steps:

comparing at least two first candidates vectors, delivering a piece of information on proximity between said first candidate vectors, capable of taking a first value indicating that said first candidate vectors are identical or proximate according to a predetermined criterion and a second value indicating that said first candidate vectors are not identical or proximate according to said predetermined criterion;

if said information on proximity takes said first value, building said optimal selection subset with one of said first candidate vectors and at least one second candidate vector, distinct from said first candidate vectors; and if said information on proximity takes said second value, building said optimal selection subset with said first candidate vectors.

12. A device for decoding pieces of motion information, wherein the device comprises:

means for selecting a motion vector for at least one current block of a current image to be decoded, comprising:

means for determining an optimal selection subset containing a part of at least three candidate vectors, means for reading a piece of selection information provided by encoding and designating one of the vectors of said optimal selection subset, and means for selecting said motion vector among the vectors of said optimal selection subset from said piece of selection information read;

wherein said means for determining an optimal selection subset is configured to:

compare at least two first candidates vectors, delivering a piece of information on proximity between said first candidate vectors, capable of taking a first value indicating that said first candidate vectors are identical or proximate according to a predetermined criterion and a second value indicating that said first candidate vectors are not identical or proximate according to said predetermined criterion;

if said information on proximity takes said first value, build said optimal selection subset with one of said first candidate vectors and at least one second candidate vector, distinct from said first candidate vectors; and if said information on proximity takes said second value, build said optimal selection subset with said first candidate vectors.

* * * * *

UNITED STATES PATENT AND TRADEMARK OFFICE
CERTIFICATE OF CORRECTION

PATENT NO. : 8,891,628 B2  
APPLICATION NO. : 13/379197  
DATED : November 18, 2014  
INVENTOR(S) : Pateux et al.

Page 1 of 1

It is certified that error appears in the above-identified patent and that said Letters Patent is hereby corrected as shown below:

In the Claims

Column 13:  
Claim 1, line 8, delete "candidates" and insert --candidate--.

Column 14:  
Claim 8, line 6, delete "candidates" and insert --candidate--.  
Claim 9, line 36, delete "candidates" and insert --candidate--.  
Claim 10, line 65, delete "candidates" and insert --candidate--.

Column 15:  
Claim 11, line 30, delete "candidates" and insert --candidate--.

Column 16:  
Claim 12, line 22, delete "candidates" and insert --candidate--.

Signed and Sealed this  
Twenty-third Day of June, 2015

Michelle K. Lee  
*Director of the United States Patent and Trademark Office*